2,706,708
PROCESS FOR SEPARATING CUMENE FROM CUMENE HYDROPEROXIDE

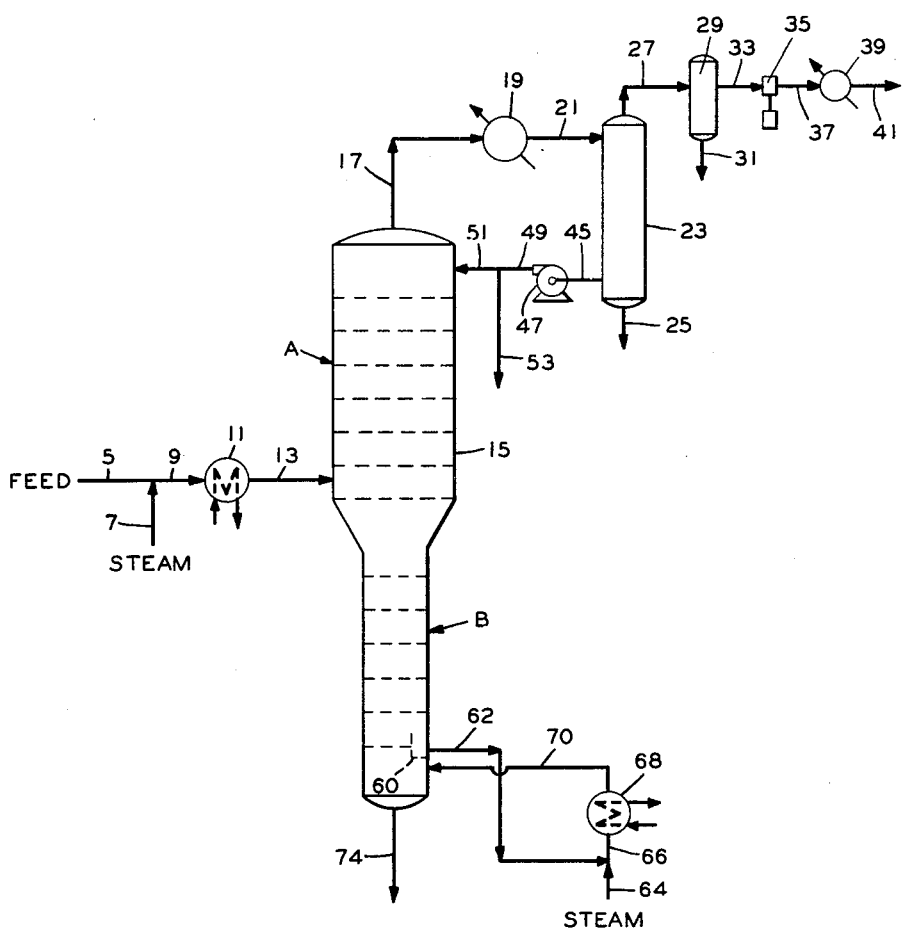

Sidney M. Frank, West Orange, and Martin J. Barry, Ridgewood, N. J., assignors to The M. W. Kellogg Company, Jersey City, N. J., a corporation of Delaware Application November 6, 1953, Serial No. 390,626

7 Claims. (Cl. 202—46)

This invention relates to a process for the separation of dialkylarylmethyl hydroperoxide from dialkylarylmethane, and more particularly, it is concerned with a method of separating cumene hydroperoxide from cumene.

Phenol and other related aromatic compounds can be prepared by the method involving the oxidation of a dialkylarylmethane type of compound in which a tertiary carbon atom is attached to the cyclic radical. As a result of the oxidation step, the product contains a mixture of hydroperoxide, unreacted hydrocarbon material and various by-products. Generally, the dialkylarylmethyl hydroperoxide has a low volatility, and its boiling characteristics are sufficiently similar to the unreacted hydrocarbon that difficulty is encountered in the separation of this material by conventional means. Further, the hydroperoxide is usually not stable at elevated temperatures, and so extreme care should be exercised in the selection of the conditions under which this material is recovered from the reaction product. Conventional stripping is also not adequate for this purpose by reason that the product contains an undesired quantity of unreacted hydrocarbon and by-product materials. In order to obtain a high purity material containing hydroperoxide, a prohibitive quantity of stripping agent is necessary. Hence, on the basis of economics alone, such a technique is not desirable for commercial exploitation. By means of the present invention, a method of separation is suggested whereby a high purity hydroperoxide product is produced by economical means.

An object of this invention is to separate a dialkylarylmethyl hydroperoxide compound from a dialkylarylmethane compound.

Another object of this invention is to provide a method for separating cumene hydroperoxide from cumene.

Other objects and advantages of this invention will become apparent from the following description and explanation thereof.

In accordance with the present invention, a method for separating a dialklyarylmethyl hydroperoxide compound from a dialkylarylmethane compound is provided which comprises contacting a mixture of said compounds with steam in a subatmospheric separating zone under suitable conditions such that a substantial portion of the dialkylarylmethane compound is vaporized, and the remaining liquid contains a major amount of the dialkylarylmethyl hydroperoxide compound, and then the remaining liquid is contacted with steam in a stripping zone in such quantities and under such conditions that substantially all of the dialkylarylmethane compound is removed therefrom, and a liquid containing substantially all of the dialkylarylmethyl hydroperoxide is produced.

For the purpose of this specification and the appended claims, hydroperoxide or hydroperoxide product means dialkylarylmethyl hydroperoxide and unreacted hydrocarbon or hydrocarbon means dialkylarylmethane.

The present invention is concerned with mixtures of hydroperoxide and unreacted hydrocarbon in which the hydroperoxide comprises about 10 to about 50% by weight of the total material. As a result of the oxidation step in which the hydrocarbon is converted by means of air or molecular oxygen to the corresponding hydroperoxide, by-product materials, e. g., dimethylbenzyl alcohol, acetophenone, dicumene peroxide, ethylbenzyl hydroperoxide, etc., are produced. The presence of by-product materials tends to obscure the separation of the hydroperoxide from the unreacted hydrocarbon. These by-product materials usually comprise not more than about 5% of the total mixture, and the remainder is unreacted hydrocarbon, and, generally, it comprises about 45 to about 85% by weight. The dialkylarylmethane compound can be represented by the following structural formula:

I 

in which $R_1$ and $R_2$ represent alkyl groups and Ar represents aryl or alkaryl groups and H is hydrogen. As a result of oxidation, the compound is converted to the corresponding hydroperoxide having the following structural formula:

II 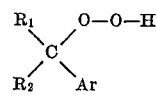

in which $R_1$, $R_2$, Ar and H are the same as represented above in Formula I and O represents oxygen. Specific examples of the hydroperoxides are cumene hydroperoxide, cymene hydroperoxide, a,a-dimethylphenylmethyl hydroperoxide, a,a-methylethylphenylmethyl hydroperoxide, a,a-diethylphenylmethyl hydroperoxide, etc. Specific examples of the unreacted hydrocarbon can be any one of the starting compounds from which the just enumerated hydroperoxides are derived.

In the separation of dialkylarylmethyl hydroperoxide from dialkylarylmethane by means of steam, it is necessary to employ a subatmospheric pressure when it is desired to produce a hydroperoxide product substantially free of water. At the temperatures employed generally for the separation, the steam employed is present in the separation zone as a vapor, hence, it is removed with the vaporous overhead product in the operation. For the purpose of maintaining steam in the separation zone in the uncondensed form, it is advisable to employ subatmospheric pressures in the range of about 90 to about 200 mm. Hg absolute, more usually, about 100 to about 150 mm. Hg absolute. At these pressures, the steam used in the separation treatment is removed overhead from the separating zone as a vapor and the vapor pressure of the unreacted hydrocarbon, viz., dialkylarylmethane is high enough so that it is yielded overhead as part of the overhead product from the initial separation zone, e. g., the fractionation zone.

From a commercial standpoint, it is important to select the operating pressure of this separating zone so as to insure the subsequent condensation of steam and unreacted hydrocarbon at about the ambient temperature of water, which can be used for indirect cooling of the overhead product from the separating zone. In this respect, when utilizing water at an ambient temperature for the purpose of cooling the overhead product from the fractionation zone, a narrow range of operating pressure is available for this purpose, e. g., in the order of about 50 to about 80 mm. Hg absolute. In other cases, when the operating pressure is outside of the range just described, it may be necessary to employ a cooling medium which exists at a temperature below the ambient level. While this technique is not as economical as using water which exists at an ambient temperature as the cooling medium, nevertheless, it is within the scope of the present invention.

In the case of a material which is sensitive to temperature and subject to thermal decomposition, as in the present case, there is a maximum temperature which is not exceeded, and usually, the separation is effected at or about this maximum temperature, hence, the pressure and quantity of steam are regulated for effective separation for the most part. With regard to the separation of unreacted hydrocarbon from cumene hydroperoxide in the fractionation zone, a temperature of about 150° to about 200° F. is employed. For other homologues, a similar temperature differential in the separation zone can be used, however, the actual values will differ, because the maximum permissible temperature varies with the specific material. The overhead temperature of the fractionation zone is sufficient for the passage of substantially all of the unreacted hydrocarbon from the fractionation zone as a vapor, and this temperature is too low for the removal of significant quantities of hydroperoxide therewith. Generally, the overhead product from the fractionation zone contains about 0.5 to about 5% of dialkylarylmethyl hydroperoxide, more usually about 0.5 to 1.5% of the same, and the remainder is comprised of substantially all of the dialkylarylmethane compound and small amounts of acetophenone and dimethylbenzyl alcohol.

The feed mixture containing the hydroperoxide and unreacted hydrocarbon is introduced into the fractionation zone along with the steam. The quantity of steam employed for this purpose varies from about 10 to about 25% by weight, based on the feed mixture. Larger quantities of steam can be employed with the feed material, however, the separation of the hydrocarbon from the hydroperoxide reaches a point of diminishing return, and it makes little difference how much steam is used, it is not possible to separate all of the hydrocarbon from the hydroperoxide by the use of steam alone. Hence, it is important from an operational standpoint to employ quantities of steam falling in the range mentioned above, otherwise, little or no benefit is derived from the use of the additional steam, or the operation is too expensive when considered from an economical standpoint alone. Further, excessive quantities of steam tend to drive overhead the hydroperoxide, hence, this can be a serious disadvantage. As a result of the quantity of steam used with the feed material and the temperature and pressure existing in the fractionation zone, there remains a liquid material in the separation zone containing a substantial portion or a major amount of the hydroperoxide and a small quantity or a minor amount of the hydrocarbon. Generally, the conditions of fractionation are selected on the basis of obtaining a liquid material containing at least about 50% of the hydroperoxide which is introduced into the system, more usually, about 55 to about 85% of the hydroperoxide, on the same basis as a result of the initial contact of the feed with steam. The temperature at which the feed material is fed to the fractionation zone does not exceed the maximum permissible for the particular hydroperoxide, although the maximum temperature is preferred.

The liquid material leaving the bottom of the fractionation zone is passed to a stripping zone wherein the pressure is maintained within the same range as described above in connection with the fractionation zone and at a temperature not exceeding the maximum permissible temperature for the particular hydroperoxide at the bottom thereof. In the stripping zone, the liquid material, e. g., containing at least 50% hydroperoxide, is contacted with additional quantities of steam in order to strip therefrom all or substantially all of the unreacted hydrocarbon. In this connection, the quantity of steam used varies from about 25 to about 50%, based on the total weight of the liquid feed material to the fractionation zone. By means of the additional quantity of steam which is fed to the stripping zone, the unreacted hydrocarbon is removed easily and effectively from the liquid material, and it is thereby possible to produce a liquid product from the stripping zone which contains at least about 80% by weight of hydroperoxide or, more usually, at least 90% by weight of hydroperoxide and up to about 95% by weight thereof. The steam and vaporized unreacted hydrocarbon material are discharged from the stripping zone, and they are usually passed into the fractionation zone for treatment in accordance with the procedure described above. By this practice, it is to be noted that the quantity of steam which is present in the fractionation zone is enhanced by the quantity of steam which is added to the stripping zone for the purposes described above.

In order to obtain a better understanding of the present invention, reference will be had to the accompanying drawing which illustrates a specific embodiment thereof.

A feed material comprised of cumene, cumene hydroperoxide and by-product materials is introduced by means of a line 5 at the rate of 12,574 pounds per hour. In this mixture, on the same hourly basis, cumene comprises 9242 pounds and cumene hydroperoxide comprises 2947 pounds. Saturated steam existing at a pressure of 15 p. s. i. g. is introduced by means of a line 7 at the rate of 2720 pounds per hour. The combined streams of feed and steam passed through a line 9 prior to entering a heating element 11 wherein the temperature is raised to 200° F. The heated mixture of steam and feed pass from the heating element 11 to a line 13, and thence, it is introduced into the bottom part of the fractionation section A of a tower 15. At the top of the tower, the pressure is maintained at 110 mm. of mercury and at a temperature of 150° F.

By reason of the conditions existing in the fractionation section A, a vaporous overhead product is yielded from the top thereof by means of a line 17. The overhead vapors pass from line 17 to a condenser 19 wherein the temperature is reduced to 100° F., and thereby a substantial part of the material is liquefied. The cooled overhead product is passed from condenser 19 to a line 21, and thence, it flows to an accumulator 23. In the accumulator 23, the condensed steam forms a lower liquid level therein which is removed from the bottom of the accumulator 23 by means of a line 25 at the rate of 6,071 pounds per hour. The pressure in the accumulator 23 is maintained at 80 mm. of mercury.

The uncondensed overhead product is removed from the top of accumulator 23 by means of a line 27, and it is then passed to a separating drum 29. Any liquid which is entrained in these vapors is discharged from the bottom of a separating drum by means of a line 31. The vapors are removed from the separating drum 29 by means of a line 33, and thence, they are transported by means of a pump 35 to a line 37 leading to a condenser 39. By means of a pump 35, the pressure is increased from 80 mm. of mercury to about 756 mm. of mercury, thus causing additional condensation of this material when cooled to a temperature of 100° F. in condenser 39. The condensed material is discharged from condenser 39 to a line 41 at the rate of 103 pounds per hour. On the same hourly basis, this material contains 46 pounds of cumene and 34 pounds of water. Above the level of water (not shown) in accumulator 23, hydrocarbon is withdrawn by means of a line 45, and it is transported by means of a pump 47 to a line 49. Part of this material is recycled to the top of the fractionation section A by means of a line 51 at the rate of 2890 pounds per hour. The remainder of the overhead liquid product is discharged from the system by means of a line 53 at the rate of 9297 pounds per hour. On the same hourly basis, the remaining liquid product contains 9157 pounds of cumene and 100 pounds of cumene hydroperoxide.

The liquid material being discharged from the bottom of fractionation section A enters stripping section B. At the bottom of the stripping section, the temperature is maintained at 200° F. and the pressure at 150 mm. of mercury. The temperature in the stripping section is maintained by withdrawing liquid material from a tray 60 within the bottom part thereof and passing the same to a line 62. This material is at a temperature of 172° F. Saturated steam at a pressure of 15 p. s. i. g. is fed from the line 64 at the rate of 3420 pounds per hour. Steam and liquid material from the stripping section B are combined and pass as a single stream into line 66 which leads to a heating element 68. The heated mixture of steam and liquid from the stripping section B are passed from the heating element 68 to a line 70, and thence, it enters the bottom of stripping section B at a point below tray 60 therein. Cumene hydroperoxide product is withdrawn from the bottom of stripping section B by means of a line 74 at the rate of 3266 pounds per hour. On the same hourly basis, this bottom liquid yield contains 2847 pounds of cumene hydroperoxide and 39 pounds of cumene.

Having thus provided a description of our invention along with specific examples thereof, it should be understood that no undue limitations or restrictions are to be imposed by reason thereof, but that the present invention is defined by the appending claims.

We claim:

1. A process for separating dialkylarylmethane from dialkylarylmethyl hydroperoxide which comprises heating a mixture of said compounds to a temperature not greater than the decomposition temperature of said hydroperoxide, combining the heated mixture with steam, passing said mixture and steam into a separation zone wherein the mixture is separated into an overhead vaporous fraction containing substantially all dialkylarylmethane and a liquid fraction containing a major amount of dialkylarylmethyl hydroperoxide and a minor amount of dialkylarylmethane, contacting the liquid fraction with additional steam in a stripping zone whereby the dialkylarylmethane is stripped from the dialkylarylmethyl hydroperoxide, passing the stripped dialkylarylmethane material from the stripping zone to the aforesaid separation zone, and yielding the hydroperoxide substantially free of dialkylarylmethane from the stripping zone.

2. The process of claim 1 wherein dialkylarylmethane is cumene and the hydroperoxide is cumene hydroperoxide.

3. A process for separating dialkylarylmethane from dialkylarylmethyl hydroperoxide which comprises heating a mixture of said compounds containing about 10 to about 50% of the hydroperoxide to a temperature not greater than the decomposition temperature of said hydroperoxide, combining the heated mixture with steam, passing the said mixture in steam into a fractionation zone wherein the mixture is separated into an overhead vaporous fraction containing about 0.5 to about 5% of hydroperoxide and the remainder is substantially all of the dialkylarylmethane which is fed to the fractionation zone and a liquid fraction containing about 55 to about 85% of the hydroperoxide and the remainder is essentially dialkylarylmethane, contacting the liquid fraction with additional steam in the stripping zone whereby the dialkylarylmethane is stripped from the dialkylarylmethyl hydroperoxide, passing a gaseous effluent containing dialkylarylmethane from the stripping zone to the fractionation zone, and yielding a liquid fraction from the stripping zone containing at least 90% hydroperoxide.

4. The process of claim 3 wherein the dialkylarylmethane is cumene and the hydroperoxide is cumene hydroperoxide.

5. A process for separating dialkylarylmethane from dialkylarylmethyl hydroperoxide which comprises heating a mixture of said compounds containing about 10 to about 50% hydroperoxide to a temperature not greater than the decomposition temperature of said hydroperoxide, combining the heated mixture with steam in the amount of about 10 to 25%, passing the mixture in steam into a fractionation zone wherein the mixture is separated into an overhead vaporous fraction containing about 0.5 to about 5% of the hydroperoxide and the remainder is essentially all of the dialkylarylmethane which is fed to the fractionation zone and a liquid fraction containing about 55 to about 85% hydroperoxide and the remainder is essentially dialkylarylmethane, contacting the liquid fraction with additional steam in the amount of about 25 to about 50% based on the feed to the fractionation zone in a stripping zone whereby the dialkylarylmethane is stripped from the hydroperoxide, passing a gaseous effluent containing dialkylarylmethane from the stripping zone to the fractionation zone and yielding from the stripping zone a liquid fraction containing about 90 to about 95% of the hydroperoxide which is fed to the fractionation zone.

6. The process of claim 5 wherein the dialkylarylmethane is cumene and the hydroperoxide is cumene hydroperoxide.

7. A process for separating cumene from cumene hydroperoxide which comprises heating a mixture of said compounds containing about 10 to about 50% of the hydroperoxide to a temperature in the order of about 200° F., combining the heated mixture with steam in the amount of about 10 to about 25% by weight, passing the mixture and steam into a fractionation zone wherein a temperature of about 150° to about 200° F. and a pressure of about 100 to about 150 mm. mercury absolute are maintained, thereby the mixture is separated into an overhead vaporous fraction containing substantially all of the cumene which is fed to the fractionation zone and the remainder is essentially about 0.5 to about 5% hydroperoxide and a liquid fraction containing about 55 to about 85% of the hydroperoxide and the remainder is essentially cumene, cooling the vaporous overhead fraction at a pressure of about 50 to about 80 mm. mercury absolute indirectly with liquid water which is at an ambient temperature, thereby condensing substantially all of cumene, cumene hydroperoxide and steam, separating the condensed steam from the mixture of cumene and cumene hydroperoxide, contacting the liquid fraction containing about 55 to about 85% of hydroperoxide with additional steam in the amount of about 25 to about 50% by weight, based on the feed to the fractionation zone, in a stripping zone wherein a temperature of about 200° F. and a pressure of about 100 to about 150 mm. mercury absolute are maintained, thereby the cumene is stripped from the mixture containing the hydroperoxide and a gaseous effluent containing the cumene is passed to the fractionation zone and a liquid product is yielded from the stripping zone containing about 90 to about 95% of the hydroperoxide which is fed to the fractionation zone.

No references cited.